US010321051B2

(12) United States Patent
Balasubramanian et al.

(10) Patent No.: US 10,321,051 B2
(45) Date of Patent: Jun. 11, 2019

(54) INTELLIGENT IMAGE ENHANCEMENT

(71) Applicant: INTERNATIONAL BUSINESS MACHINES CORPORATION, Armonk, NY (US)

(72) Inventors: Swaminathan Balasubramanian, Troy, MI (US); Radha M. De, Howrah (IN); Ashley D. Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 14 days.

(21) Appl. No.: 15/226,041

(22) Filed: Aug. 2, 2016

(65) Prior Publication Data

US 2018/0041696 A1   Feb. 8, 2018

(51) Int. Cl.
*H04N 5/232* (2006.01)
*G06F 16/58* (2019.01)
*G06K 9/20* (2006.01)

(52) U.S. Cl.
CPC ..... *H04N 5/23222* (2013.01); *G06F 16/5866* (2019.01); *G06K 9/20* (2013.01); *H04N 5/23206* (2013.01); *H04N 5/23216* (2013.01); *G06K 2209/27* (2013.01)

(58) Field of Classification Search
CPC ........... H04N 5/23222; H04N 5/23206; H04N 5/23216; G06F 17/30268; G06F 16/5866; G06K 9/6202; G06K 9/20; G06K 2209/27

USPC ............................................ 348/231.3, 231.6
See application file for complete search history.

(56) References Cited

U.S. PATENT DOCUMENTS

| | | | |
|---|---|---|---|
| 6,970,189 B1 | 11/2005 | Bernstein et al. | |
| 2004/0263634 A1* | 12/2004 | Kiuchi | H04N 1/00347 348/207.99 |
| 2009/0016565 A1 | 1/2009 | Kulumani | |
| 2011/0314049 A1* | 12/2011 | Poirier | G06F 17/30241 707/769 |
| 2014/0078315 A1 | 3/2014 | Carlsson | |
| 2014/0354768 A1* | 12/2014 | Mei | H04N 5/23222 348/36 |
| 2015/0085145 A1 | 3/2015 | Sinha et al. | |
| 2015/0138396 A1* | 5/2015 | Sako | H04N 5/23216 348/231.6 |
| 2017/0041527 A1* | 2/2017 | Pettersson | G06F 3/04847 |
| 2018/0316853 A1* | 11/2018 | Liang | H04N 5/23222 |

\* cited by examiner

*Primary Examiner* — Albert H Cutler
(74) *Attorney, Agent, or Firm* — Griffiths & Seaton PLLC (57) ABSTRACT

Embodiments for facilitating recording images to improve quality by a processor. A candidate image of a first device is compared against a database of previously saved images. One of the previously saved images obtained by a second device, and thereby, stored context metadata associated with the one of the previously saved images, is selected. The stored context metadata of the one of the previously saved images is provided to the first device, such that a configuration on the first device is selectable to be changed to match a configuration of the second device used to obtain the one of the previously saved images.

18 Claims, 8 Drawing Sheets

INTELLIGENT IMAGE ENHANCEMENT

BACKGROUND OF THE INVENTION

Field of the Invention

The present invention relates in general to computing systems, and more particularly to, various embodiments for facilitating recording images to improve quality using a computing processor.

Description of the Related Art

In today's society, consumers, businesspersons, educators, and others use various images (e.g., photographs and video) with increasing frequency in a variety of settings. With the proliferation of images has also come various ways to accommodate the increasing amount of digital information corresponding to the images. For example, many photographs are now stored in large databases within and between distributed computing components, where individuals can access the images on a number of devices (e.g., computers, handheld devices, phones, tablets, and the like). In addition to the images being more readily accessible, the images are also sharable between individuals, such as by allowing access or sharing through social media scenarios.

SUMMARY OF THE INVENTION

Various embodiments for facilitating recording images by a processor, are provided. In one embodiment, by way of example only, a method for facilitating recording images, again by a processor, is provided. A candidate image of a first device is compared against a database of previously saved images. One of the previously saved images obtained by a second device, and thereby, stored context metadata associated with the one of the previously saved images, is selected. The stored context metadata of the one of the previously saved images is provided to the first device, such that a configuration on the first device is selectable to be changed to match a configuration of the second device used to obtain the one of the previously saved images.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously indicated, digital data representative of images (e.g., video or photos) is increasingly proliferating. Data is increasingly processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

With the proliferation and management of photos and their associated digital information, has come a desire for users to better manage their own personal photographs. Very often, a user may like the version of a photograph or video taken by a friend or associate's camera, smartphone, or other device. The user may want to take a photograph that has similar features, quality, or other characteristics from their own device.

As one of ordinary skill in the art will appreciate, a "good" photograph or video is dependent on a number of factors, including such factors as camera settings, shooting position, angle, lighting, and other factors. Many digital photographs and other images include with them detailed metadata about the photo taken and camera settings. In today's age of advanced photography, every modern snap accompanies Exchangeable Image Files (EXIFs), which unveil much photo information, such as camera specifications, scene information, and the like.

The mechanisms of the illustrated embodiments leverage burgeoning data processing and storage infrastructures for images to allow users to glimpse into other user settings and other device and location configuration information when recording their own images, as will be described. These mechanisms may make use of existing metadata, or may collect, organize, and disseminate additional metadata information related to a particular image. This metadata, inclusive of the aforementioned EXIF data, may be termed herein as "context metadata."

Context metadata may include a wide variety of information relating to an image or series of images, some of which may be additional information than what is typically contained in image EXIF data. Accordingly, context metadata may include such information as the GPS coordinates of the location where the image was obtained, or the direction that the camera was pointed to obtain the particular image, or weather information at the moment the image was obtained such as temperature, relative humidity, cloud cover, and other similar weather information, for example. One of ordinary skill in the art will appreciate that context metadata may be inclusive of any helpful information that relates in any way to the image obtained.

As will be further described, in various embodiments, the mechanisms of the present invention may process the context metadata relating to various images (e.g., photos and video) in a variety of ways. The mechanisms may store the context metadata in a database, organize the data according to a variety of individual factors, and link the context metadata to specific images, among other functionality. The processed context metadata then may be made to be accessible by users desiring to match one or more characteristics of the image they wish to record with a previously stored image.

In one embodiment, the user submits what will be termed herein as a "candidate image." This image is, in a sense, preliminary, as it provides the mechanisms of the illustrated embodiments with preliminary information about a particular image desired to be recorded. Based on the candidate image supplied, the mechanisms of the illustrated embodiments may then search one or more image databases (or other repositories) for matching images, and use one of a number of mechanisms to select the matching image having what is determined to be the "best" overall quality. One of ordinary skill in the art will appreciate that there are various conventional mechanisms for filtering between various images and selecting one with a determined highest level of quality, such as by examining on a pixel-by-pixel basis.

As one of ordinary skill in the art will appreciate, a "matching" image may be determined in a variety of ways. The matching image may have shared characteristics, it may be the selection of an analytical mechanism that identifies a best fit of differing criteria, or, for example, it may be an image that has a high social media-based acceptance in terms of quality, number of images taken from a specific location, or other attributes.

The mechanisms are then able to glean the context metadata from the candidate image, and then extract the context metadata corresponding to the selected image with the highest determined quality for comparison. Ultimately, information from the selected best quality image will be used to supplant and/or replace the information from the candidate image. Further, in some embodiments, the mechanisms of the illustrated embodiments may filter selected images by the associated context metadata, such that a highest quality image with the attributes that are able to be provided by the equipment of the user that provided the candidate image. For example, some matching images may be discovered that have qualities unobtainable by the user's equipment (such as a higher resolution). Those images may be passed over in favor of a next highest quality image that better matches up against the equipment that created the user's candidate image.

Once a matching image is found, the mechanisms of the illustrated embodiments may provide the matching image's context metadata to the user, in order for the user to enhance their own image collection capabilities, in a number of ways. For example, the mechanisms of the illustrated embodiments may notify the user that a matching image has been located in the database, show the user the previously recorded image, and give the user options for selecting the same setting, or moving their device to another location, and so forth. In some embodiments, the mechanisms may make the corresponding configuration changes on the user's device automatically as a background process, and ask the user to reshoot the image(s). In this way, the user is empowered with the additional information from the database to record images with a perceived higher quality, or other improvements. Other examples of this functionality, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
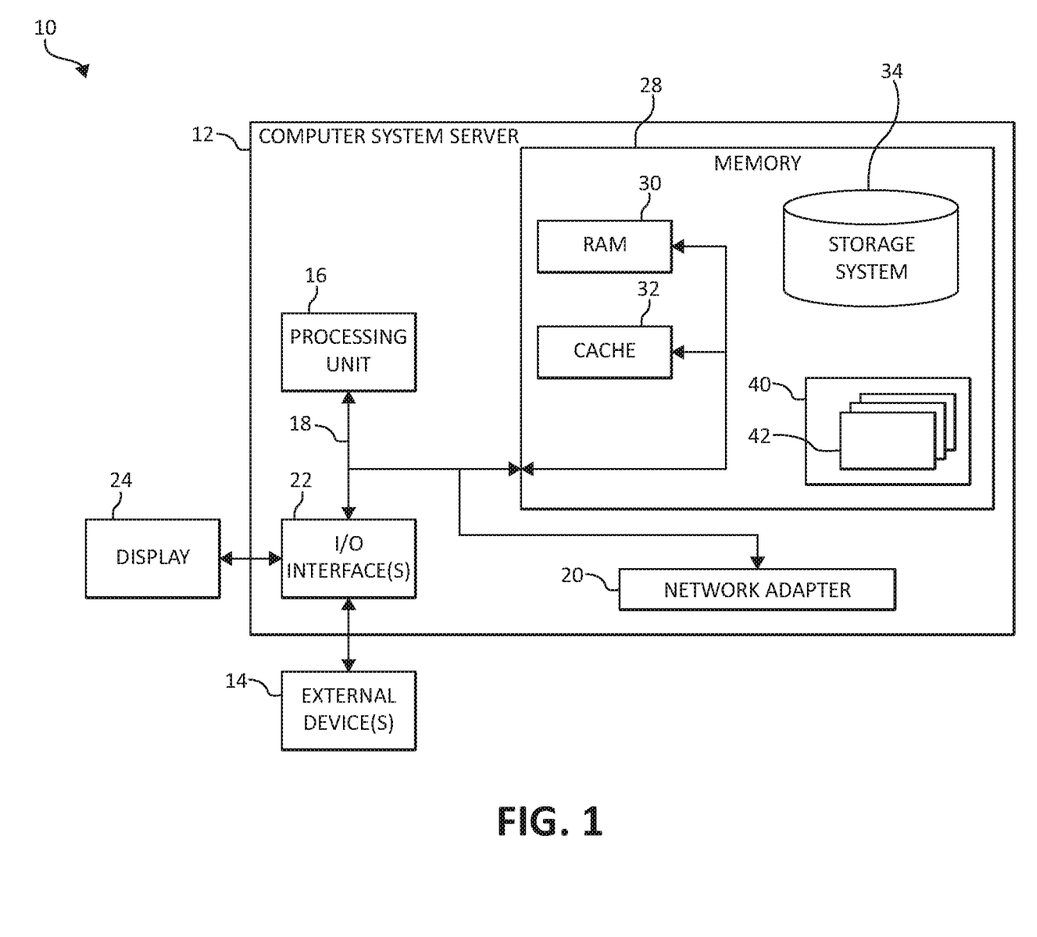
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
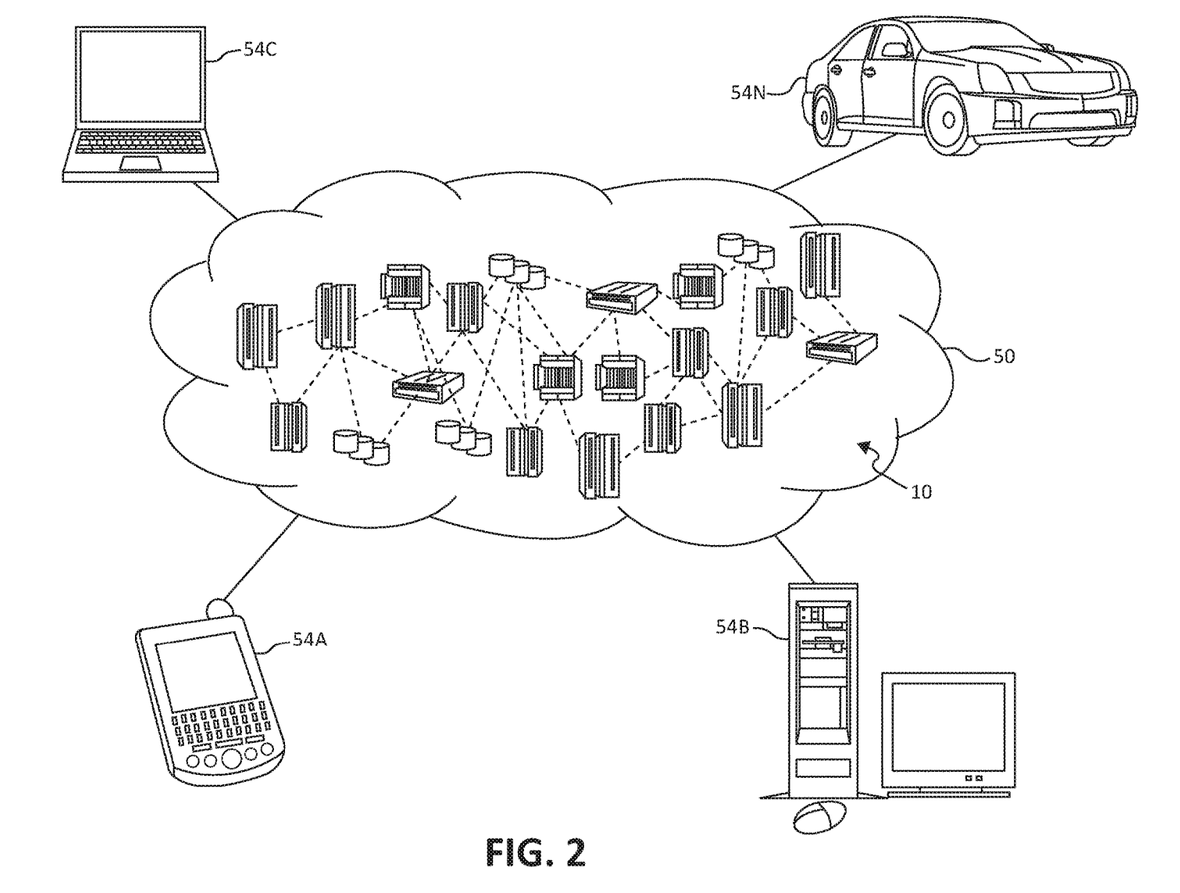
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
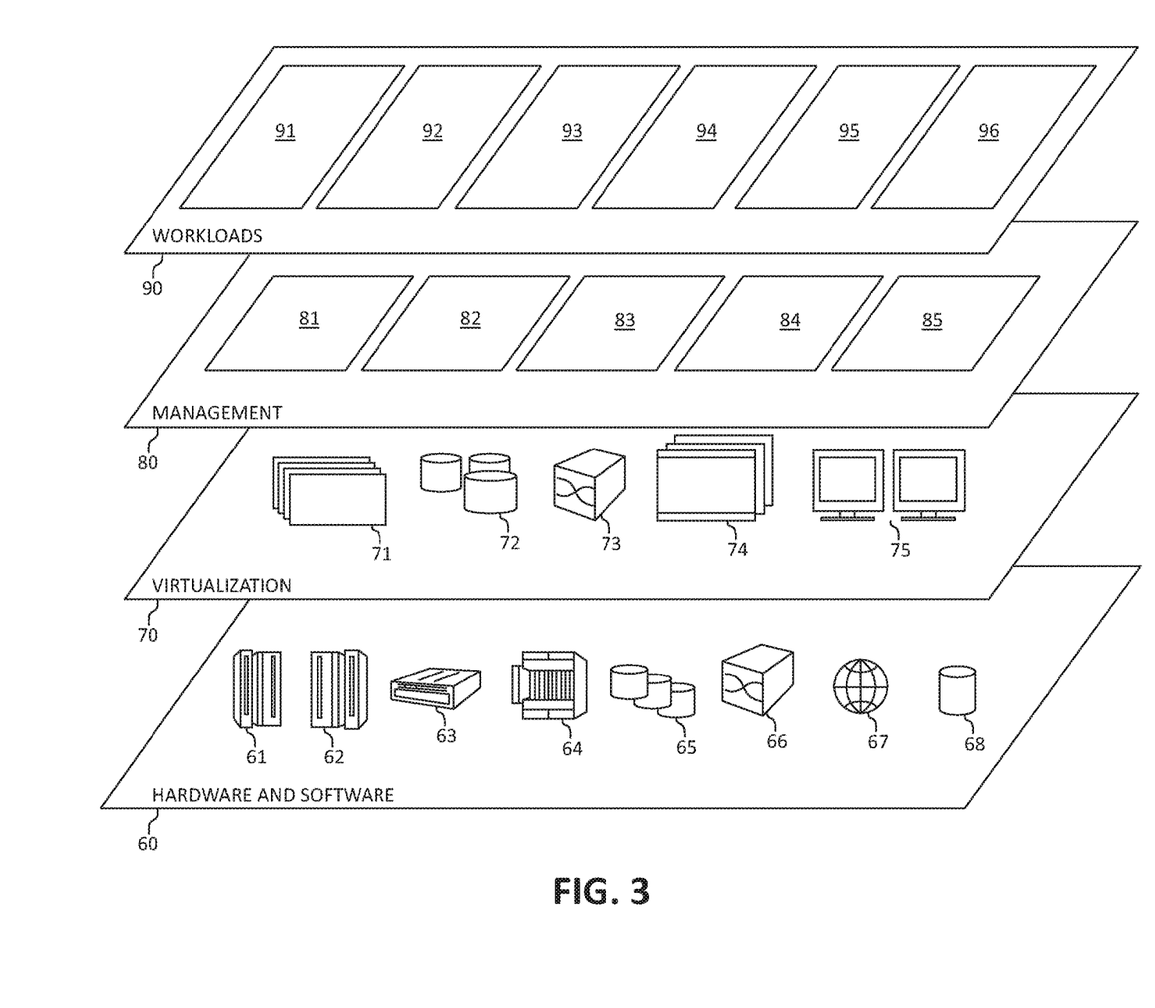
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various image processing workloads and functions 96. In addition, image processing workloads and functions 96 may include such operations as context metadata analytics, context metadata analysis, and as will be further described, user and device management functions. One of ordinary skill in the art will appreciate that the image processing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the improvement of recording images (video, photos, etc.) by, among other aspects, automated remote configuration ("remote control") of device settings, positioning, and other factors based, at least in part, on data obtained from the same image subjects previously recorded.

In one embodiment, the configuration settings may be selected based on a variety of context metadata information. This information may include among other details, for example, the type of camera, time of photography, focal length setting, shutter speed setting, lens and lens size information, and the like. As previously mentioned, the context metadata information may be gleaned from the image EXIF data as well as supplemental data about the particular image. All of the available information (technical, EXIF data as well as additional data) may be then provided to the user-whose camera is then set to one or more settings that obtained the higher quality image discovered in the database, such as the aforementioned location information where the image was obtained.

As will be further described, in addition to mechanisms for improving image quality based on previously saved images, other aspects of the mechanisms of the illustrated embodiments may include the following. First, the functionality of the user's device itself may be augmented to include the connectivity to a remote context database repository to store and retrieve information, and the functionality of allowing the remote configurability of settings and/or configurability by the user with recommendations.

Next, the mechanisms of the illustrated embodiments include methodologies for collection and archival of digital images, along with the corresponding contextual metadata (inclusive of EXIF files), usage of the contextual metadata to build analytical models based on multiple images (of, for example, the same subjects), and logic to select best fit (given the user's candidate image/current contextual metadata) for providing the appropriate image/metadata/configuration settings back to the user. Finally, the mechanisms allow for the collection and organization of the collection of the final image(s) obtained with the updated configuration settings, and functionality for sharing the final images and configuration information with still other users via social media or other sharing technologies.

Figure 4:
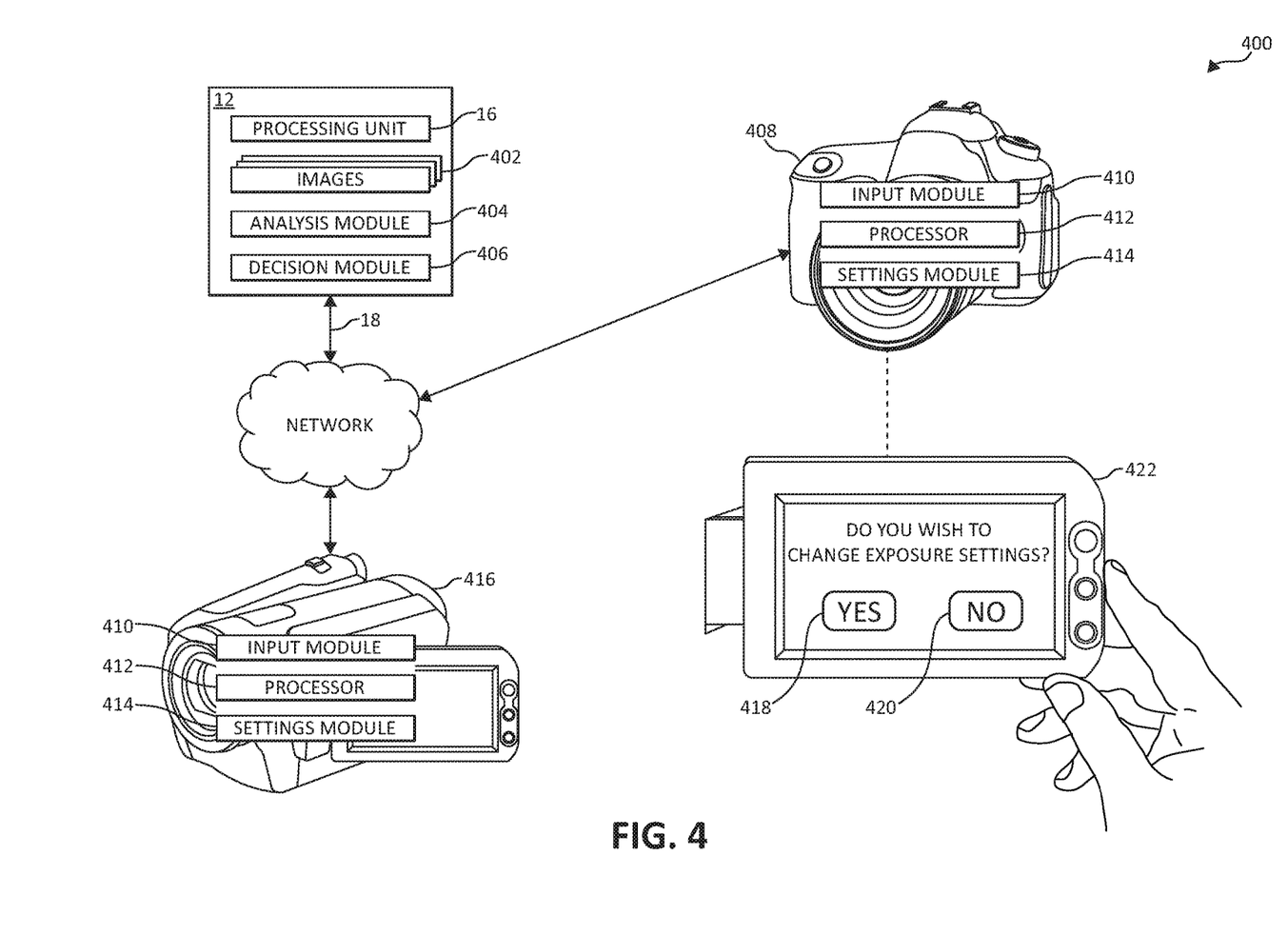
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. Computer system/server 12 is again shown, incorporating processing unit 16 to perform various computational, data processing and other functionality in accordance with various aspects of the present invention. A database of images and corresponding context metadata 402 is shown, along with an analysis module 404 and a decision module 406.

As one of ordinary skill in the art will appreciate, the depiction of the various functional units in computer system/server 12 is for purposes of illustration, as the functional units may be located within computer system/server 12 or elsewhere within and/or between distributed computing components. The images data 402 may include various images that were previously saved by other users, for example. The images data 402 may also have corresponding context metadata, including a data repository of various EXIF files or/and additional metadata information (such as a geographic location where the image was obtained) that is obtained from previously obtained images.

Analysis module 404 and decision module 406 may work in concert with processing unit 16 to accomplish various aspects of the present invention. For example, analysis module 404 may undergo various data analytics functions associated with the images database 402 to find best fitting image, and thereby, context metadata associated with the previously stored images. Decision module 406 may make decisions in conjunction with the analysis module 404 to select the best fitting image(s), or in another embodiment, a basket of matching images and associated context metadata (gleaned from one previously obtained image or from a number of previously obtained images). As one of ordinary skill in the art will appreciate, the decision module 406 and analysis module 404 may implement mathematical modeling, image processing, or other data processing technologies to carry out the various mechanisms of the illustrated embodiments.

FIG. 4's components 400 as shown may include a number of image recording devices, including a video camera 416 and a ("still") camera 408. The cameras 408 and 416 are connected via communications channels (e.g., bus 18) through the network to the computer system/server 12 as shown. In one exemplary embodiment, a user may find themselves in a location where they desire to take a photo. The camera 408 of the user may have already located, and connected to, a wireless network. The camera 408 may then connect through the local wireless network through the Internet to the computer system/server 12 to provide context metadata and, in turn, receive settings information and/or instructions from the computer system/server 12.

Camera 408, and video camera 416 may incorporate additional functional components 400 such as the depicted input module 410, processor 412, and settings module 414. Here again, the use of an input module 410 and settings module 414 is merely for illustrative convenience as a variety of functional components 400 may be integrated into the cameras 408 and 416 to accomplish specific functionality to further the mechanisms of the illustrated embodiments.

Input module 410 may, in one embodiment, serve to receive image information provided by the cameras 408 and 416. For example, once the user snaps a candidate image, the input module 410 may separate the context metadata from the candidate image to be provided to the computer system/server 12. The context metadata may also be provided through the input module 410 by a user's own input, or by other devices, such as Global Positioning System (GPS) sensor devices to indicate location, or by connecting to the light meter in the user's camera 408 and 416 to determine the current lighting. A variety of input data may pass through the input module 410 to be processed by the computer system/server 12.

In similar fashion, the settings module 414 may function as an output module 414 for the cameras 408 and 416, so for example, when the computer system/server 12 provides instructions/setting recommendations/other data to the user's camera 408,416, the computer system/server 12 may provide such data as saved context metadata found to be a best fit, or EXIF file information, or a variety of other data that passes through the settings module 414. The settings module 414 may implement setting changes as a background process, or the settings module 414 may query the user, in one embodiment, whether they wish to change one or more settings, location, lighting, and other configurations on their camera 408, 416. This functionality is illustrated by example with the graphical user interface (GUI) 422, which provides information from the computer system/server 12, or receives input and/or selection data from the user.

In the depicted embodiment, the camera 408 has provided context metadata through the network to the computer system/server 12, and the computer system/server 12 has implemented various functionality to determine that, among other potential configuration changes, a recommended change to an exposure setting should be performed by the user. The camera 408 then receives the recommended setting change(s), and in the GUI 422 queries the user as to whether she wishes to change the exposure setting to the recommended setting. The user is presented with the yes 418 and no 420 buttons to select her choice as shown. If the user selects the yes button 418, the components 400 then move to implement the recommended exposure settings change on the camera 408.

Figure 5:
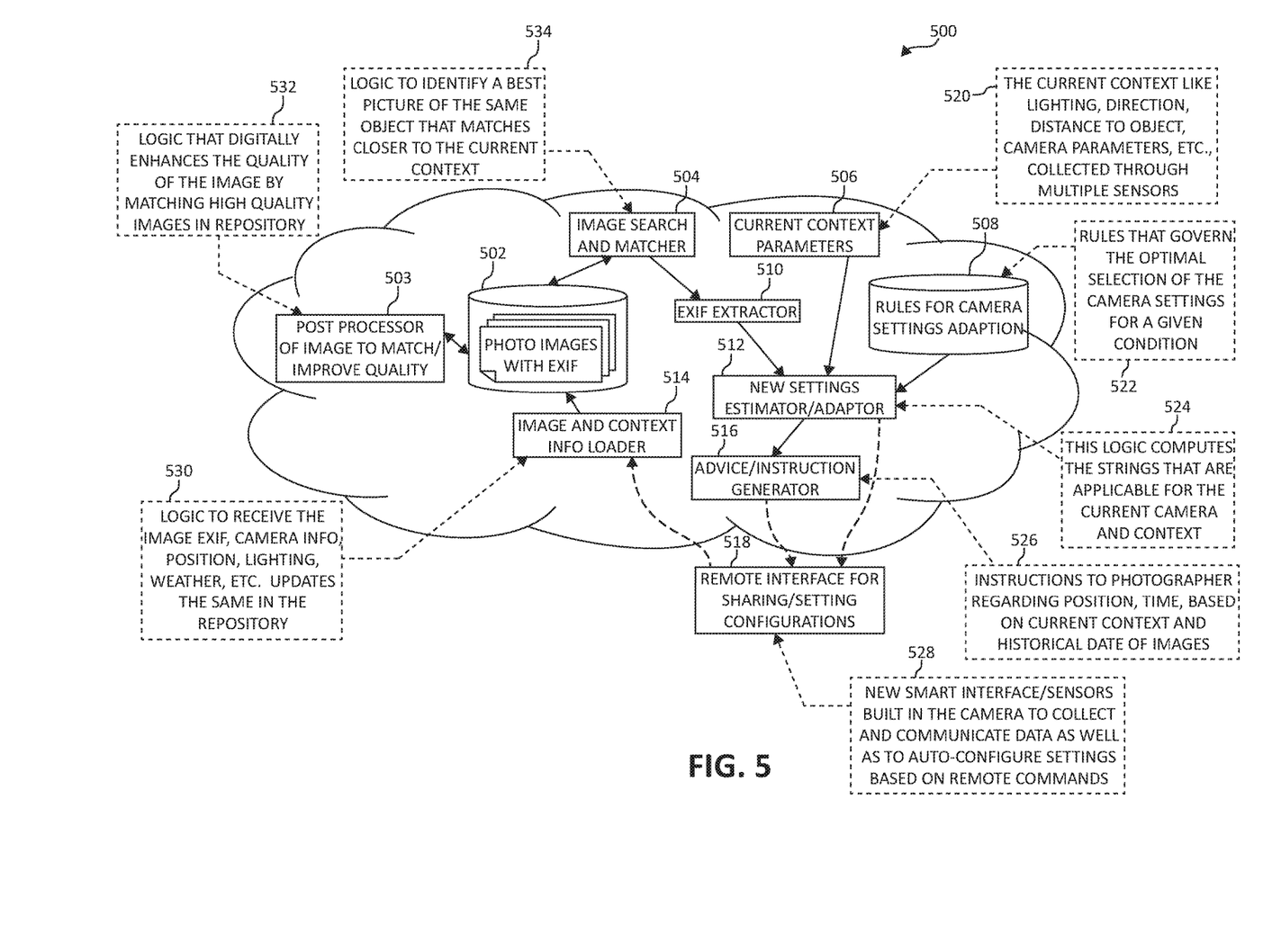
FIG. 5 is an additional block diagram depicting an exemplary functional relationship between various aspects of the present invention.

Turning now to FIG. 5, a block diagram of exemplary functionality 500 relating to image processing is depicted, for use in the overall context of intelligent image enhancement according to various aspects of the present invention. As shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIG. 4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing generalized tasks of taking a picture with their camera (e.g., illustration 501).

Starting with block 502, a database 502 is shown containing, in the depicted embodiment, photo images with accompanying EXIF file information. Here again, the database 502 may incorporate EXIF metadata information as well as a host of additional context metadata according to a particular application. An image searcher and matcher module 504 imposes various search and matching functions on incoming images in the database 502, to search for matching images as previously described. As descriptive block 534 indicates, the image search and matcher module may contain, among other aspects, logic to identify a best image of the same object (subject) that matches closer to the current context.

In conjunction with the image search and matcher 504 is an EXIF extractor module 510, which extracts EXIF context metadata information from particular images. The EXIF extractor module 510 flows to the new settings estimator/adaptor module 512, which as indicated in block 524, may contain logic that computes the strings that are applicable for the current camera and context. Also tied to the new settings estimator/adaptor module 512 are various current context parameters 506, that are described, among other aspects, by block 520 as the current context, such as lighting, direction, distance to object (subject), camera parameters, and the like, that are collected through multiple sensors, for example. In addition, rules for camera settings adaption database 508 contains, as described by block 522, among other aspects, rules that govern the optimal selection of the camera settings for a given condition. Accordingly, current context parameters 506 and rules for camera settings adaption database 508 feed into the new settings estimator/adaptor 512 as depicted.

Based on the computations from the new settings estimator/adaptor 512, the advice/instruction module 516 provides information to the user device as depicted in block 526, including instructions to the photographer regarding such characteristics as time, position, and other factors based on current context and historical data of images. The instruction is provided to the user device via the remote interface for sharing/setting configurations module 518, which presents the information to the user. In one embodiment, as depicted in block 528, the remote interface module 518 implements a smart interface with sensors built into the camera to collect and communicate data, as well as auto-configure settings based on remote commands.

Completing out the various functional blocks 500 is block 503, which functions by post processing images to match/improve quality, and further described by block 532 as including logic that digitally enhances the quality of the image by matching high quality images in the repository. Finally, as part of the candidate and image finalizing process, the remote interface 518 allows for the input of candidate and final imagery, along with relevant context metadata, into the database 502 through the image and context info loader module 514, which is further described by block 530 to implement, among other functionality, logic to receive the image EXIF, camera info, position, lighting, weather, and other data and input the information into the database 502.

With the foregoing functional components 500 in view, consider some of the various aspects of the illustrated embodiments. Among other aspects, the mechanisms of the present invention incorporate the following: (1) providing a smart device (e.g., camera) for sharing/setting camera configurations. Today's conventional digital cameras, for example, may be enhanced by these aspects with smart functionality including an ability to upload images with accompanying context metadata such as camera configuration, camera specifications, current position/angle with respect to the object of photo, weather conditions, and the like. In one embodiment, the enhanced user devices may also be configured with an ability to receive camera controlling configuration information through remote commands sent by a cloud-based system, and auto adjust the settings (such as aperture, shutter speed, focal length, brightness, and the like) based on these remote commands.

(2) The mechanisms of the present invention initialize an image repository and image search and matcher function. Continuing the cloud-based example, images uploaded by various users may be uploaded to the cloud. These images may be attached with EXIF metadata and other rich context metadata, inclusive of associated environmental information. When, for example, a new image is received for "help" (e.g., candidate image), the new image may be matched against existing images to identify various object(s) or subject(s) in the field of view of the image. The matching stored image is compared against the newly submitted image based on a number of factors, such as similarity of metadata (e.g., type of camera, camera settings, etc.) and other contextual parameters such as lighting, position, and the like. If multiple images are found, the image with the best picture quality may be selected. If the same object(s) is not found, the best matching one (e.g., similar building, similar type of photo, group photo) may be selected.

(3) The mechanisms of the present invention may implement a new settings estimator/adaptor as previously described. A 100% match of object, camera specs, camera settings, and other contextual parameters may be difficult to achieve. Hence, a certain extent of adaptation will be necessary. This is a kind of extrapolation of fitting of the parameters of the best matching image for the current situation. This adaptation or adjusting of camera settings will be based on the expert rules stored in the cloud based advising system. These rules are specific instructions to set camera configurations for the given context.

(4) The mechanisms of the present invention may implement an advice/instruction generator, which may be controlled by various rules, or a "rule base." The advice/instruction refers to additional instructions that may be provided to the user, such as changing the distance of shooting, or asking to wait for some time before taking the image due to a weather situation, etc. These configuration settings are beyond auto-setting of the camera itself.

(5) As mentioned in FIG. 5, previously, the mechanisms of the illustrated embodiments may use a post-processing function applied to the uploaded image, which may auto-enhance the image based on an existing image in the repository. This functionality may include auto-applied digital enhancement such as increasing or decreasing brightness, eliminating noise, enlarging portions of the image, and so forth.

Consider the following example of an implementation of the aforementioned functionality. The system may read a photograph's EXIF data, when the image to be taken is coming in focus of some other image capture device (e.g., video camera, camera or smart phone). Once the EXIF information is available to the other device, the system may begin analyzing the present surrounding in terms of light brightness, fog density etc., to adjust the camera configuration to come closer to extracted EXIF specifications. Once this analysis is complete, the device may then prompt the user to take a snap of their preferred object with the expectation that newly captured snap will come closer in look and feel to the photo that the user, or another user preferred, earlier. In some cases, the user may not be able to get to the physical location they wish to take the image they desire (perhaps a physical obstruction, or a group of persons in that location due to the location's popularity). In those scenarios, once the user is focusing on the subject, the mechanisms of the illustrated embodiments may take the image, passing the image for analysis, and sending information to the camera as before to adjust configuration settings (or the captured image in post processing) in view of the surrounding condition. Accordingly, the user will be able to simulate the visual effect of their preferred photograph with the benefit of the location information they are unable to position the camera in at the time.

Figure 6:
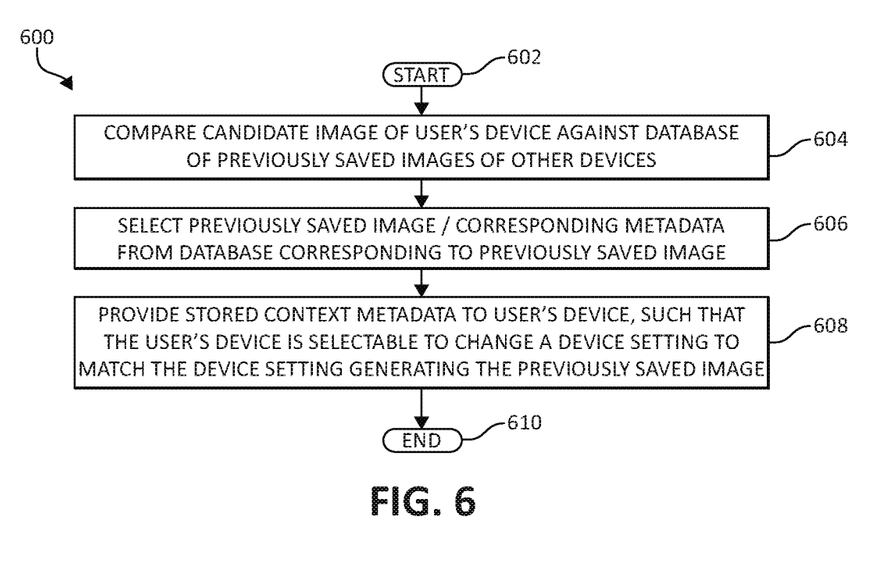
FIG. 6 is a flowchart diagram depicting an exemplary method for facilitating recording images by a processor, in which aspects of the present invention may be realized.

Turning now to FIG. 6, a method 600 for image enhancement by a processor is depicted, in which various aspects of the illustrated embodiments may be implemented. Method 600 begins (step 602), with the comparison of a candidate image of a user's device against a database of previously saved images of other devices (step 604). The previously saved image and corresponding context metadata is selected from the database corresponding to the previously saved image (step 606). The stored context metadata is provided to the user's device, such that the user's device is selectable to change a device setting (including configuration and location information, as per a specific scenario) to match the device setting generating the previously saved image (step 608). The method 600 then ends (step 610).

Figure 7:
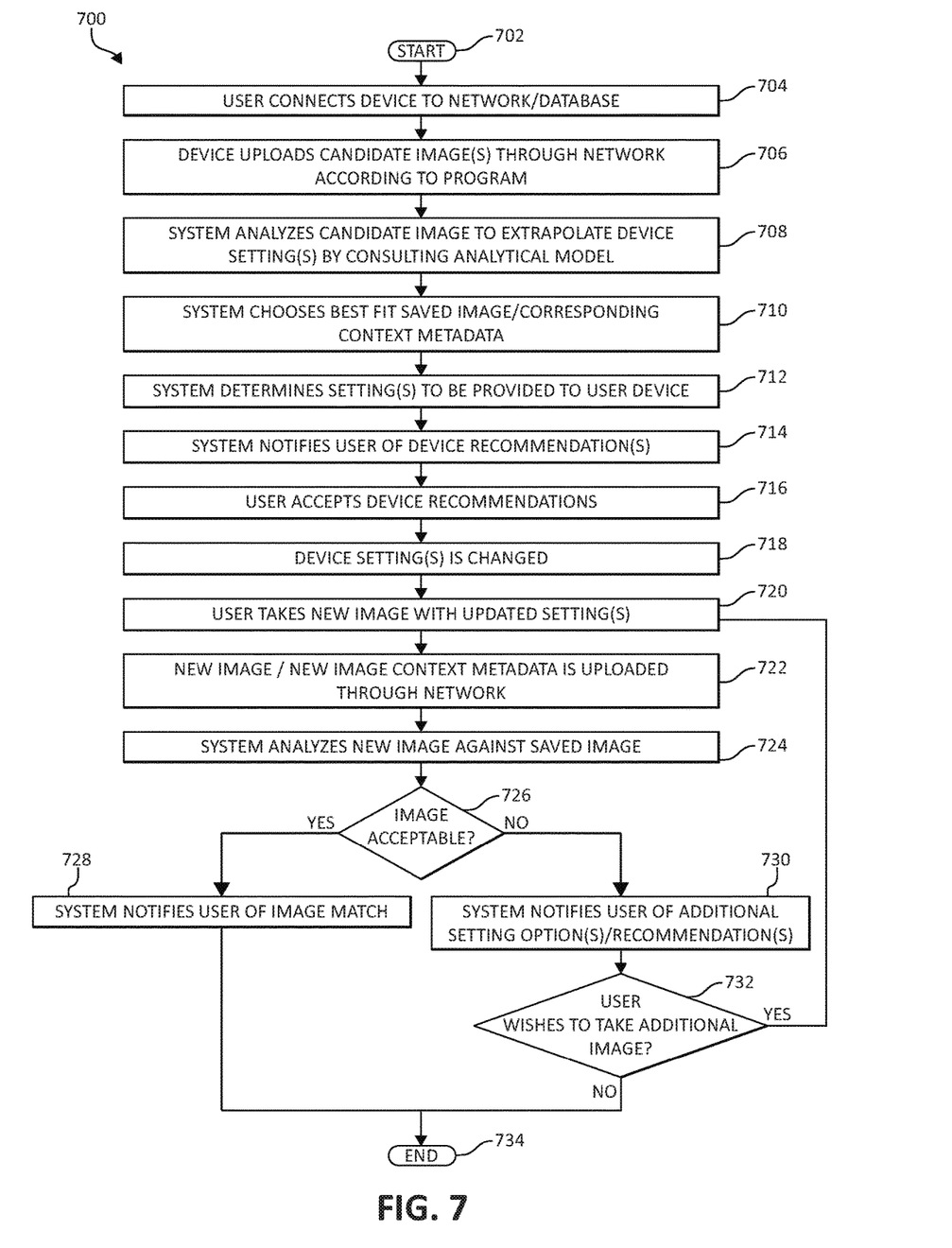
FIG. 7 is an additional flowchart diagram depicting an additional exemplary method for facilitating recording images by a processor, again in which aspects of the present invention may be realized.

Method 700 in FIG. 7, following, also depicts an exemplary embodiment for image enhancement in accordance with various aspects of the present invention. Method 700 begins (step 702) with the user connecting his/her device to the network and thereby the image and context metadata repository(ies) (step 704). As previously mentioned, the connection may occur automatically as the user finds themselves in a supported wireless network, for example.

Turning to step 706, the device uploads a candidate image (or/and corresponding metadata) through the network according to a preexisting program. The system then analyzes the candidate image to extrapolate device setting(s) by consulting one or more analytical models (step 708). The system chooses the best fit saved image/corresponding context metadata by various analytics (step 710), and including the various contextual settings and configurations as necessary to be provided to the user device (step 712). In an alternative embodiment, the system post processes the user's candidate image according to the matching settings found to enhance the existing image.

Once the configuration and context settings are determined, the user is notified of the device recommendation(s) in step 714, and the device's setting(s) is changed (step 718). The user is then free to take a final image with the updated configuration settings now in place on his device (step 720). The new image/new image context metadata is then uploaded through the network in step 722, and the system then goes again to work analyzing the submitted image with the new setting(s) (step 724). If the recent upload is deemed to be acceptable per the system's analytics (decision step 726), the system notifies the user of an acceptable image match (step 728), and the method 700 then ends (step 734).

Returning to step 726, if the system alternatively finds that additional changes to enhance the image are possible, the system notifies the user of additional setting option(s)/recommendation(s) in step 730. If the user wishes to take a further image in accordance with the updated recommendations in step 732, the user takes another new image, and the method returns to step 720 for further analysis. Alternatively, the method 700 then ends (again, step 734).

Figure 8:
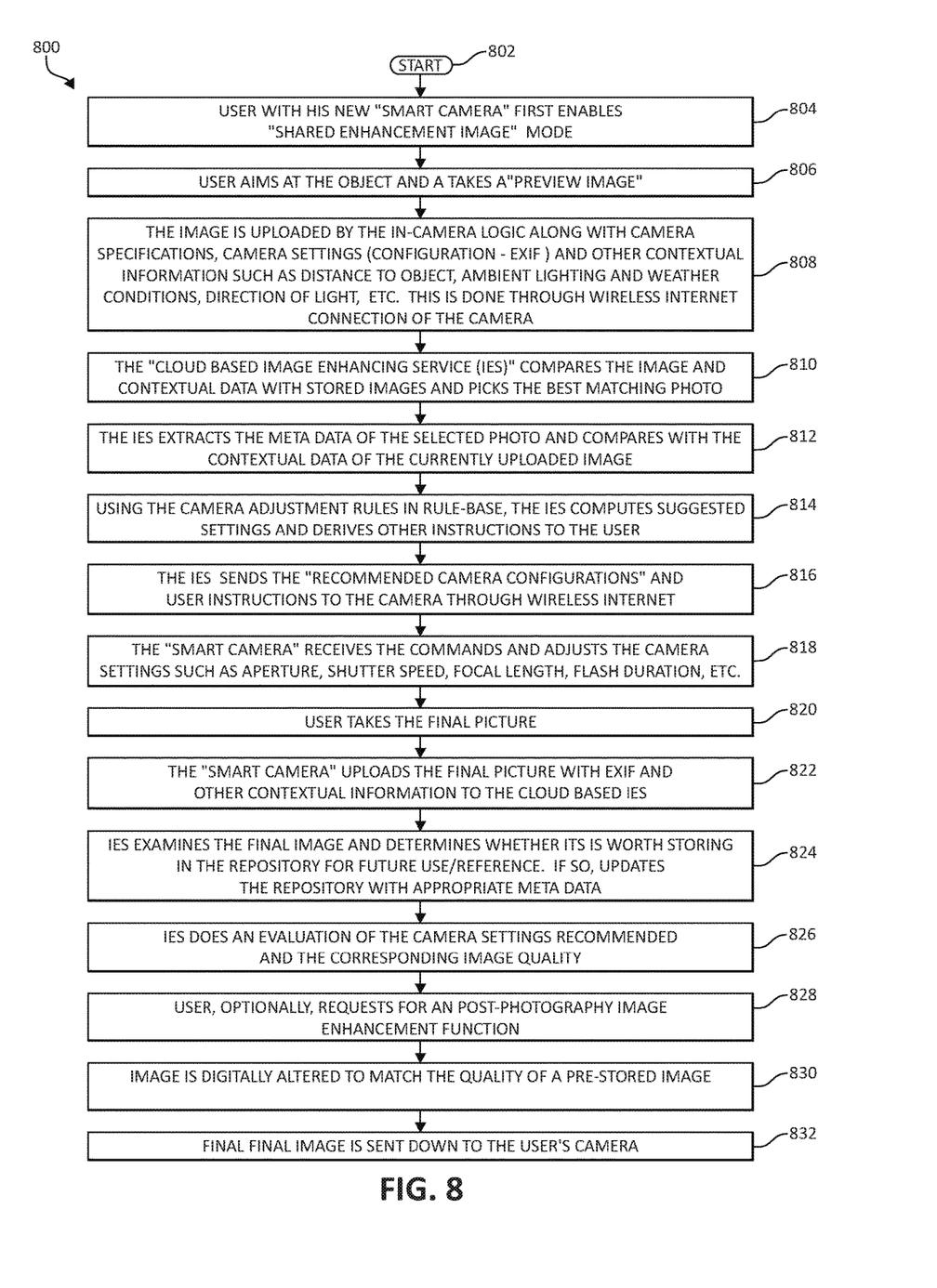
FIG. 8 is an additional flowchart diagram depicting an exemplary method for facilitating recording images by a processor; again in which aspects of the present invention may be realized.

Turning now to FIG. 8, an additional exemplary embodiment of image enhancement pursuant to the various aspects of the present invention is depicted in method 800. Method 800 begins (step 802) with a user with his new "smart camera" first enabling "shared enhancement image" mode (step 804). The user aims at the object and a takes a "preview image" (candidate image) in step 806. The image is uploaded by the in-camera logic along with camera specifications, camera settings (configuration—EXIF) and other contextual information such as distance to object, ambient lighting and weather conditions, direction of light, etc., which again, in one embodiment, is performed through wireless internet connection of the camera (step 808). In a next step, the "cloud based image enhancing service (IES)" compares the image with stored images and picks the best matching photo (step 810). The IES extracts the metadata of the selected photo and compares with the contextual data of the currently uploaded image (step 812). In a following step 814, using the camera adjustment rules in rule-base, the IES computes suggested settings and derives other instructions to be provided to the user. The IES sends the "recommended camera configurations" and user instructions to the camera through wireless internet (step 816). The "smart camera" receives the commands and adjusts the camera settings such as aperture, shutter speed, focal length, flash duration, etc. (step 818). The user takes the final picture in step 820. In a following step, the "smart camera" uploads the final picture with EXIF and other contextual information to the cloud based IES (step 822). IES examines the final image and determines whether the final image is worth storing in the repository for future use/reference. If so, the IES updates the repository with appropriate metadata (step 824). IES does an evaluation of the camera settings recommended and the corresponding image quality in step 826, following. In step 828, the user, optionally, requests for a post-photography image enhancement function. In step 830, the image is digitally altered to match the quality of a pre-stored image. In a final step 832, the final, final image is sent down to the user's camera.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for facilitating recording images to improve quality, comprising:
    comparing a candidate image of a first device against a database of previously saved images;
    selecting one of the previously saved images obtained by a second device, and thereby, stored context metadata associated with the one of the previously saved images;
    providing the stored context metadata of the one of the previously saved images to the first device such that a configuration on the first device is selectable to be changed to match a configuration of the second device used to obtain the one of the previously saved images; and
    upon selecting the context metadata from the one of the previously saved images:
        adapting the context metadata to the first device, including adapting a setting of the second device to the first device by extrapolating device parameter used by the second device compromising a first device type or model to capture the one of the previously saved images and using the extrapolation to adapt the setting of the first device compromising a second device type or model; wherein the configuration on the first device is matched to the configuration of the second device notwithstanding whether or not the device parameters are set to be identical; and wherein adapting the context metadata further includes using the extrapolation of the device parameters used by the second device to adapt the setting of the second device to the first device while commensurately adapting device parameters used by the first device according to the current physical surroundings of the first device to obtain the candidate image having image characteristics resembling the one of the previously saved images,
        sending the adapted setting to the first device, and
        automatically changing the configuration on the first device to incorporate the adapted setting.

2. The method of claim 1, further including initializing the database in a computing storage environment within and between distributed computing components.

3. The method of claim 1, further including building an analytical model based on a plurality of the previously saved images in reference to an object in the images, such that reference is made to the analytical model when selecting the one of the previously saved images based on the candidate image.

4. The method of claim 1, further including initializing a program for collecting images and corresponding context metadata from a plurality of devices to be stored in the database.

5. The method of claim 1, wherein the context metadata includes Exchangeable Image File (EXIF) format data, and further including initializing, upon a connection of the first device to the database, transfer of the context metadata from the first device to the database.

6. The method of claim 1, wherein selecting one of the previously saved images obtained by a second device further includes analyzing the candidate image from the first device against the one of the previously saved images from the second device to match the image characteristics of the candidate image and the one of the previously saved images such that a best fit is obtained between the matched image characteristics if the one of the previously saved images is selected.

7. A system for facilitating recording images to improve quality, comprising:
   a processor, operational within and between a distributed computing environment, that
      compares a candidate image of a first device against a database of previously saved images,
      selects one of the previously saved images obtained by a second device, and thereby, stored context metadata associated with the one of the previously saved images,
      provides the stored context metadata of the one of the previously saved images to the first device such that a configuration on the first device is selectable to be changed to match a configuration of the second device used to obtain the one of the previously saved images, and
      upon selecting the context metadata from the one of the previously saved images:
         adapts the context metadata to the first device, including adapting a setting of the second device to the first device by extrapolating device parameters used by the second device comprising a first device type or model to capture the one of the previously saved images and using the extrapolation to adapt the setting of the first device comprising a second device type or model; wherein the configuration on the first device is matched to the configuration of the second device notwithstanding whether or not the device parameters are set to be identical; and wherein adapting the context metadata further includes using the extrapolation of the device parameters used by the second device to adapt the setting of the second device to the first device while commensurately adapting device parameters used by the first device according to current physical surroundings of the device to obtain the candidate image having image characteristics resembling the one of the previously saved images,
         sends the adapted setting to the first device, and automatically changes the configuration on the first device to incorporate the adapted setting.

8. The system of claim 7, wherein the processor initializes the database in a computing storage environment within and between distributed computing components.

9. The system of claim 7, wherein the processor builds an analytical model based on a plurality of the previously saved images in reference to an object in the images, such that reference is made to the analytical model when selecting the one of the previously saved images based on the candidate image.

10. The system of claim 7, wherein the processor initializes a program for collecting images and corresponding context metadata from a plurality of devices to be stored in the database.

11. The system of claim 7, wherein the context metadata includes Exchangeable Image File (EXIF) format data, and wherein the processor initializes, upon a connection of the first device to the database, transfer of the context metadata from the first device to the database.

12. The system of claim 7, wherein the processor, pursuant to selecting one of the previously saved images obtained by a second device, analyzes the candidate image from the first device against the one of the previously saved images from the second device to match the image characteristics of the candidate image and the one of the previously saved images such that a best fit is obtained between the matched image characteristics if the one of the previously saved images is selected.

13. A computer program product for, by a processor, facilitating recording images to improve quality, the computer program product comprising a non-transitory computer-readable storage medium having computer-readable program code portions stored therein, the computer-readable program code portions comprising:
   an executable portion that compares a candidate image of a first device against a database of previously saved images;
   an executable portion that selects one of the previously saved images obtained by a second device, and thereby, stored context metadata associated with the one of the previously saved images;
   an executable portion that provides the stored context metadata of the one of the previously saved images to the first device such that a configuration on the first device is selectable to be changed to match a configuration of the second device used to obtain the one of the previously saved images; and
   an executable portion that, upon selecting the context metadata from the one of the previously saved images:
      adapts the context metadata to the first device, including adapting a setting of the second device to the first device by extrapolating device parameters used by the second device comprising a first device type or model to capture the one of the previously saved images and using the extrapolation to adapt the setting of the first device comprising a second device type or model; wherein the configuration on the first device is matched to the configuration of the second device notwithstanding whether or not the device parameters are set to be identical; and wherein adapting the context metadata further includes using the extrapolation of the device parameters used by the second device to adapt the setting of the second device to the first device while commensurately adapting device parameters used by the first device according to current physical surroundings of the first device to obtain the candidate image having image characteristics resembling the one of the previously saved images,
      sends the adapted setting to the first device, and automatically changes the configuration on the first device to incorporate the adapted setting.

14. The computer program product of claim 13, further including an executable portion that initializes the database in a computing storage environment within and between distributed computing components.

15. The computer program product of claim 13, further including an executable portion that builds an analytical model based on a plurality of the previously saved images in reference to an object in the images, such that reference is made to the analytical model when selecting the one of the previously saved images based on the candidate image.

16. The computer program product of claim 13, further including an executable portion that initializes a program for collecting images and corresponding context metadata from a plurality of devices to be stored in the database.

17. The computer program product of claim 13, wherein the context metadata includes Exchangeable Image File (EXIF) format data, and further including an executable portion that initializes, upon a connection of the first device to the database, transfer of the context metadata from the first device to the database.

18. The computer program product of claim 13, further including an executable portion that, pursuant to selecting one of the previously saved images obtained by a second device, analyzes the candidate image from the first device against the one of the previously saved images from the second device to match the image characteristics of the candidate image and the one of the previously saved images such that a best fit is obtained between the matched image characteristics if the one of the previously saved images is selected.

* * * * *